(12) United States Patent
Tendulkar

(10) Patent No.: US 8,930,918 B2
(45) Date of Patent: Jan. 6, 2015

(54) SYSTEM AND METHOD FOR SQL PERFORMANCE ASSURANCE SERVICES

(75) Inventor: Dattatraya Mohan Tendulkar, Maharashtra (IN)

(73) Assignee: Tata Consultancy Services Limited (IN)

( * ) Notice: Subject to any disclaimer, the term of this patent is extended or adjusted under 35 U.S.C. 154(b) by 148 days.

(21) Appl. No.: 13/697,619

(22) PCT Filed: May 18, 2011

(86) PCT No.: PCT/IN2011/000348
§ 371 (c)(1),
(2), (4) Date: Nov. 13, 2012

(87) PCT Pub. No.: WO2011/145116
PCT Pub. Date: Nov. 24, 2011

(65) Prior Publication Data
US 2013/0067440 A1    Mar. 14, 2013

(30) Foreign Application Priority Data

May 18, 2010 (IN) .......................... 1565/MUM/2010

(51) Int. Cl.
*G06F 9/44* (2006.01)
*G06F 17/30* (2006.01)

(52) U.S. Cl.
CPC ............ *G06F 8/70* (2013.01); *G06F 17/30289* (2013.01)
USPC ........... 717/134; 717/124; 717/138; 717/151; 707/713; 707/718; 707/719

(58) Field of Classification Search
CPC combination set(s) only.
See application file for complete search history.

(56) References Cited

U.S. PATENT DOCUMENTS

| | | | |
|---|---|---|---|
| 6,430,556 B1 | 8/2002 | Goldberg et al. | |
| 6,615,222 B2 | 9/2003 | Rjaibi et al. | |
| 6,718,535 B1 * | 4/2004 | Underwood | 717/101 |
| 6,907,546 B1 * | 6/2005 | Haswell et al. | 714/38.11 |
| 7,155,428 B1 | 12/2006 | Brown et al. | |
| 7,437,614 B2 * | 10/2008 | Haswell et al. | 714/38.13 |
| 7,499,907 B2 * | 3/2009 | Brown et al. | 1/1 |
| 2004/0225999 A1 * | 11/2004 | Nuss | 717/114 |
| 2005/0187944 A1 * | 8/2005 | Acheson et al. | 707/100 |
| 2008/0097995 A1 * | 4/2008 | Dias et al. | 707/8 |
| 2008/0301124 A1 * | 12/2008 | Alves et al. | 707/5 |
| 2009/0254525 A1 * | 10/2009 | Srinivasan et al. | 707/3 |
| 2010/0010968 A1 * | 1/2010 | Redlich et al. | 707/3 |
| 2010/0022231 A1 * | 1/2010 | Heins et al. | 455/418 |
| 2010/0281355 A1 * | 11/2010 | White et al. | 715/222 |
| 2011/0145795 A1 * | 6/2011 | Khanapurkar et al. | 717/126 |
| 2011/0295801 A1 * | 12/2011 | Dias et al. | 707/622 |
| 2012/0215639 A1 * | 8/2012 | Ramer et al. | 705/14.53 |
| 2013/0212086 A1 * | 8/2013 | Burger et al. | 707/718 |
| 2013/0304903 A1 * | 11/2013 | Mick et al. | 709/224 |
| 2014/0052864 A1 * | 2/2014 | Van Der Linden et al. | 709/226 |

* cited by examiner

*Primary Examiner* — Chameli Das
(74) *Attorney, Agent, or Firm* — Merchant & Gould P.C.

(57) ABSTRACT

The present invention relates to a field of evaluating the performance of a Structure Query Language (SQL) in information system. In particular, the invention proposes system and method of integration of a tool in Software Development Life Cycle (SDLC) which assures performance of SQL by estimating an execution time and remote installation of the same in a cloud based testing services. So, it can be used to detect the queries which may not perform well in the production environment.

13 Claims, 4 Drawing Sheets

SYSTEM AND METHOD FOR SQL PERFORMANCE ASSURANCE SERVICES

This application is a National Stage Application of PCT/IN2011/000348, filed 18 May 2011, which claims benefit of Serial No. 1565/MUM/2010, filed 18 May 2010 in India and which applications are incorporated herein by reference. To the extent appropriate, a claim of priority is made to each of the above disclosed applications.

CROSS REFERENCE TO THE PRESENT INVENTION

The present invention claims the benefit of co-pending patent application no. 2383/MUM/2007 titled "FIELD OF TIME ESTIMATION FOR STRUCTURE QUERY LANGUAGE (SQL) IN INFORMATION SYSTEMS" Filed on 12 May, 2007, the entire contents of which are referred herein and disclosures thereof are incorporated in the present invention by reference.

FIELD OF THE INVENTION

The present invention relates to a field of evaluating the performance of a Structure Query Language (SQL) in production environment. More particularly, the present invention relates to SQL performance assurance system for deployment level testing in a development environment.

BACKGROUND OF THE INVENTION

The systems deployed in the business applications for handling voluminous data in businesses, industries, and research organizations are getting complex. Some of the places where complex systems are deployed include applications in businesses of high social impact such as financial services, healthcare and manufacturing. These complex applications necessarily handle humungous data volumes with requires optimized system of communication with reduced latencies.

These system applications are developed and tested through specified sequence of development life cycle. In the existing application development practices during various development phases a system or part the system is tested for desired results. Such tested applications are deployed in the production environment where actually operations of the systems so tested are justified. However, often during deployment process the systems tend to behave differently, not giving expected results.

In these low latency messaging or communication systems, estimation and forecasting during development process is of crucial significance particularly before deploying such systems. In the existing practices these parameters and other related aspects are generally dealt at the time of deployment of the said systems in the production environment. This shortcoming in the existing practices is apparent due to an unavailability of an effective testing, estimation and forecasting means during development of the applications. The testing and estimation of performance of the applications development environment is essential for assuring a quality of the applications.

It is well established in the art that predicting a performance quality of a huge application in production environment before deployment is a big challenge. Though various standard quality assurance processes are in place for risk management, they are of less use to meet challenges in production environment. This is because of inconsistencies and lack of integration of various application processes. Hence, even after employing existing quality assurance measures, meeting performance Level Agreements (SLAs) is difficult to achieve. The primary reason for this is that developers are somehow clueless about performance of the coded SQL statements when deployed in a production environment having a database with millions of records.

It is difficult for the developers to anticipate the production level mistakes/errors. In spite of following all laid down quality procedures for application development, the uncertainty about the performance remains. Interestingly, the software tools available in the market for detection of performance related issues are effective only in the production environment where data volumes are high rather than in development environment. The development environment generally is emulated to represent a production environment by employing low cost, smaller machines and smaller databases. This smaller emulation is sufficient to validate the business functionality but not reliable to assure the quality and efficiency of the code.

Prior art discloses means and tools as mentioned in the foregoing section. One such typical testing tool is disclosed in U.S. Pat. No. 6,430,556 to Goldberg Robert et al., which teaches a query object generator tool, a database schema access query object and test objects in response to a user request for allowing the GUI to operate with vendor-specific databases. The test objects contain information that characterizes the query object for testing purposes. The information in the test objects is used with a test framework to install and initialize the query object. The test framework also uses the information in the test objects to customize part of the GUI in order to allow a user to view and interact with the installed query object. In particular, the customized GUI allows a developer to enter input parameters for a query directly from the interface and use the installed query object to perform a query with the input parameters. Results which are returned from the query are displayed on the interface. Though '556 patent teaches testing of the code using generated query objects and displaying of the results, it lacks emulation or creation of virtual test environment for production level testing. Also, US'556 patent don't disclose estimation of execution time in the production environment.

Another U.S. Pat. No. 6,615,222 to Hornibrook John et al. teaches a system and process for evaluating the performance of an operational database system without interfering with the normal operation of the operational database system is described. The process involves the creation of a test database which contains the system catalogs of the operational database system as user tables. The test database is used to compile queries using these simulated system catalogs. The access plan generated by the compilation in the test database can then be used to evaluate the performance of the queries. Though Hornibrook John et al. teaches a different method of estimating an execution time and remote installation which are unique from others. Also, the present invention proposes integration with Software Development Life Cycle to assure, performance of SQL.

U.S. Pat. No. 7,155,428 to Brown Douglas et al. discloses a method and apparatus provides for the extraction of environment information from a target database system. The environment information includes at least one of cost-related information and random sample statistics. The cost-related information and/or random sample statistics are imported to a test system, where the cost-related information and/or random sample statistics are used in query plan analysis by an optimizer. Though '428 provides a cost estimation and related database statistics, these are existing features available with Oracle database. The '428 patent discloses only exports the statistics in test environment and estimation time for export operation, however emulation of the test environment at remote place and estimating the execution time for SQLs is still not disclosed in the prior art.

Thus the prior arts failed to recognize the significance of performance assurance of each process in development environment rather than in production environment. Further, emulation of the test environment and a tool to test, estimate and forecast the performance related quantifiers is not substantially disclosed in the prior art.

Other features and advantages of the present invention will be explained in the following description of the invention having reference to the appended drawings.

OBJECTS OF THE INVENTION

The primary object of the invention is to provide a system and method for providing a cloud based testing service for improvement of SQL performance before deployment in the production environment.

Another object of the invention is to provide a system and method for emulating new test environment at remote place for estimating the execution time for SQLs.

Another object of the invention is to provide a performance guarantee to customers and end users regarding the experience in the deployment phase.

Another object of the invention is to detect the queries which are not performing well in the production environment.

Another object of the invention is to help in tuning the queries in development phase to get the optimized execution plan by making the necessary changes in SQL to improve the performance while executing it.

Another object of the invention is to forecast the execution time without using any hardware resources form the client's environment.

Another object of the invention is to hire the service just in time and just for the period of need in the SQL performance assurance process.

SUMMARY OF THE INVENTION

The present invention relates to a field of evaluating the performance of a Structure Query Language (SQL) in information system. In particular, the invention provides for a system and method of integration of a tool in Software Development Life Cycle (SDLC) which assures performance of SQL by estimating an execution time and remote installation of the tame in a cloud based testing services.

In the preferred embodiment of the invention the system provides a tool for performance assurance of SQL throughout Software Development Life Cycle (SDLC). In the SDLC, the system is envisaged to provide an effective testing tool at each development stage so that a developer can perfect and concretize the code during development with increased degree of certainty.

In another preferred embodiment of the invention the system provides an emulated test environment as that of production environment. Thus, providing to the developers a real time anticipation of the problems, errors, costs, time and other parameters related to the coded queries and further facilitate the developers to troubleshoot the operations of the system. The said emulated test environment is devised to improve the performance of queries before deployment in the production environment.

Accordingly, the system of the present invention creates a new virtual environment at remote place. Thus, the performance of those queries can be tested/verified during the development phase rather than the deployment phase. The said process automatically minimizes various repetitive tasks that are generally carried out in the production environment related to SQL queries.

In order to solve the above mentioned problems and assurance the SQL performance, the present invention proposes an enhanced development process termed as 'SQL Performance Assurance Process' based on SQL-PASS (SQL Performance Assurance Services). The present invention uses database production emulator principle disclosed in the earlier patent application no. 2383/MUM/2007 and provides an easy to manage, independent of development environment. The system of the present invention provides the developers to hire the service just in time and just for the period of need. The system incurs only operational expenses as against heavy capital investment. This also cuts latency—the environment is ready and available. The developers and professionals working on the development process need not to go through approvals for hard ware, software and networking separately and await the set up of the testing environment. The elastic nature of the Cloud also enables to scale up the development process while testing, and plow in more resources on the go. The system of the present invention facilitates certainty of operations and gain promised performance of SQL queries.

BRIEF DESCRIPTION OF THE ACCOMPANYING DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific system and method disclosed in the drawings.

DETAIL DESCRIPTION OF THE INVENTION

Some embodiments of this invention, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any methods, and systems similar or equivalent to those described herein can be used in the practice or testing of embodiments of the present invention, the preferred methods, and systems are now described.

Figure 1:
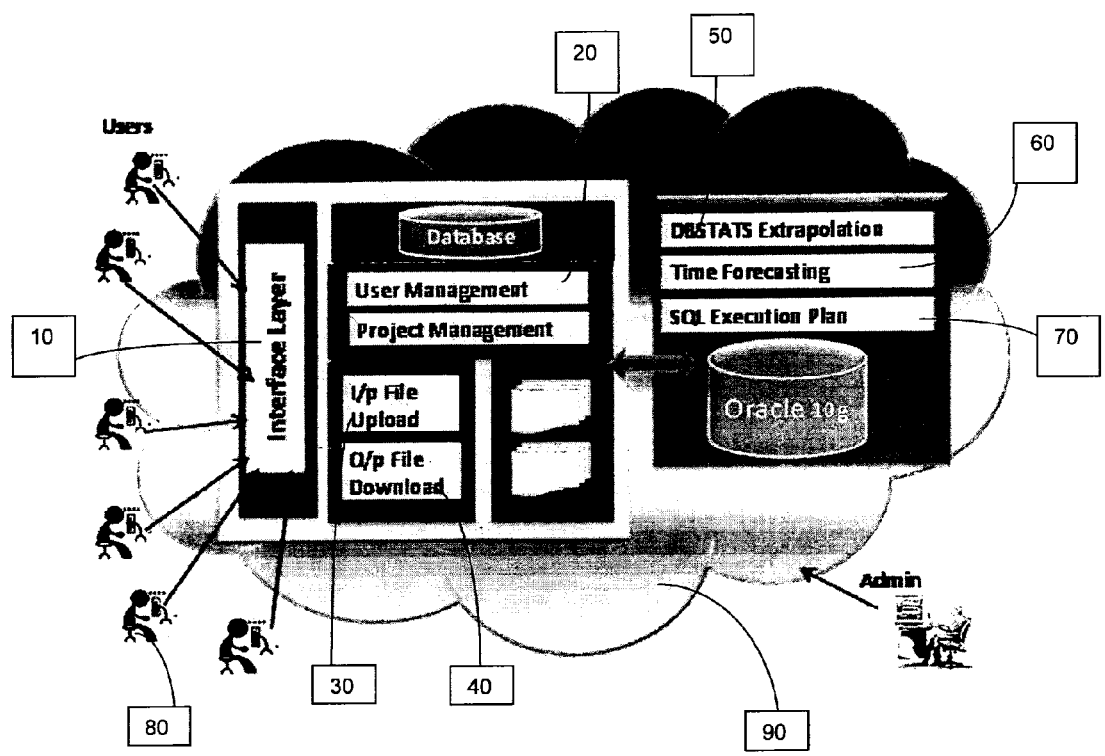
FIG. 1 shows a typical IT system business architecture comprising of different components to automate the SQL performance assurance provided in a cloud based environment.

FIG. 1 shows a business architecture comprising of different components to automate the SQL performance assurance provided in a cloud based environment (90). An interface layer (10) facilitates the various users (80) to access the SQL performance assurance service, in user management (20), the administrator can add, modify and delete the user. Only authorized users are allowed to access their own projects. An I/P file upload (30) facilitates the user to upload dumps and SQLs files and O/P file download facilitates (40) the user to download the result files. DBSTATS Extrapolation (50) facilitates the user to manipulate the database statistics. In the Time forecasting (60), it forecasts the SQL execution time in the production environment. And finally finds out the execution plan against the extrapolated data volume through SQL Execution plan (70).

Figure 2:
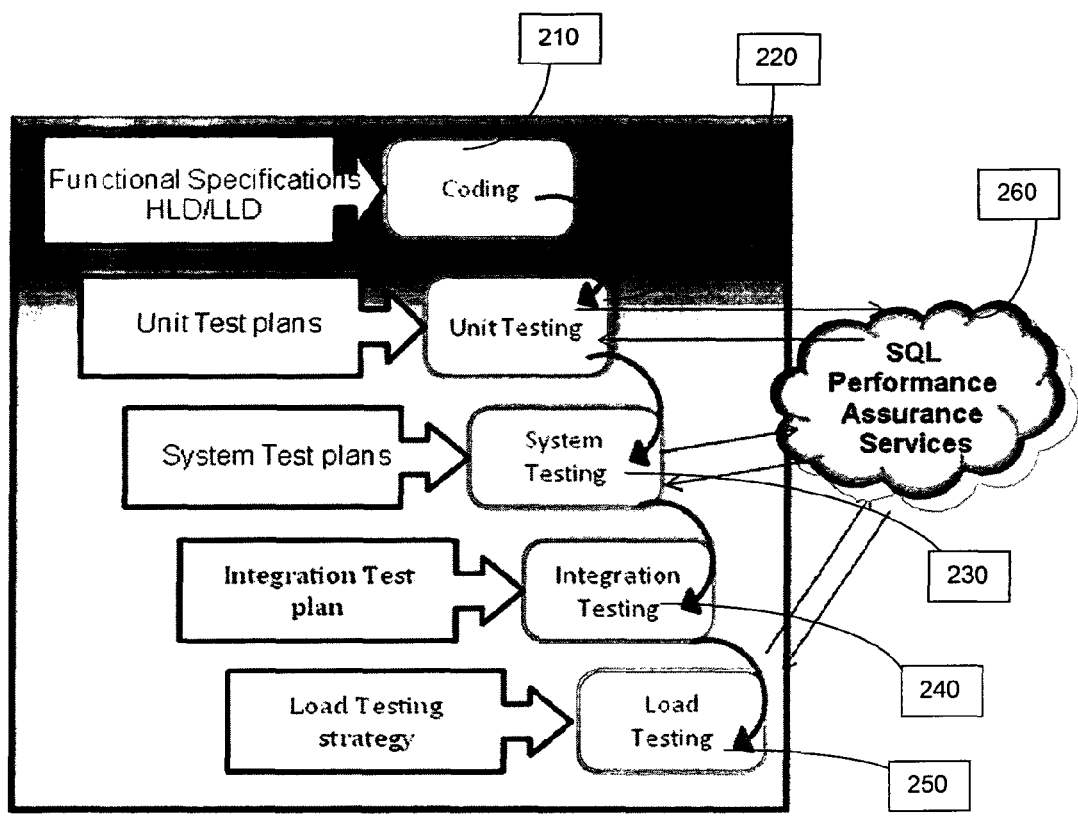
FIG. 2 shows the enhanced development process which helps to validate the performance during development rather than deployment phase according to one embodiment of the invention.

FIG. 2 shows the enhanced development process which helps to validate the performance during development rather than deployment phase. The software development process is enhanced by integrating it with SQL-PASS (260). Because of the 'service' nature it is flexible enough to introduce SQL-PASS (260) tool at any stage of the project. It means if the project is in system testing stage and SQL-PASS (260) tool was not used during unit testing still user can introduce it in the system testing phase.

Unit Testing with SQL-PASS

During coding (210), the user can check on-line the performance of newly written SQLS using SQL-PASS. The shared service is recommended for small and medium size projects where coding life cycle is just a few weeks. When a user chooses this service, he is totally free from tool installation processes and administrative hurdles such as permission for installation of executables and DBA rights. Large accounts can have their own centralized set up on the Cloud or in their premises instead of accessing a shared instance. This will give more control over process as well as more secured environment.

System Testing (230) with SQL-PASS

The SQLs getting executed as a part of particular business transactions helps user to do the relative analysis like:
SQLs taking more time and get executed frequently
SQLs taking more time but get executed occasionally
SQLs taking relatively less time but getting executed too frequently Accordingly the user can decide which SQLs needs to be tuned first and makes necessary changes in SQL to improve the performance while executing it, if required.

Load Testing with SQL-PASS

Load testing (250) is always linked with multiple concurrent users but the present invention proposes to start the load testing process by testing end to end business transactions in a single user mode. This will help in separating out the impact of high data volume from the impact of concurrent transactions load. This will give assurance about efficiency of SQLs and allow users to focus on other issues like network and concurrency of transactions during the load testing.

Maintenance with SQL-PASS

During maintenance it is very important to deploy properly tuned SQLs in the production because touching the SQLs directly in the production is risky and user has very limited time to fix the problem. Using SQL-PASS, the SQLS can be checked and tuned before deployment to avoid the performance related issues.

Figure 3:
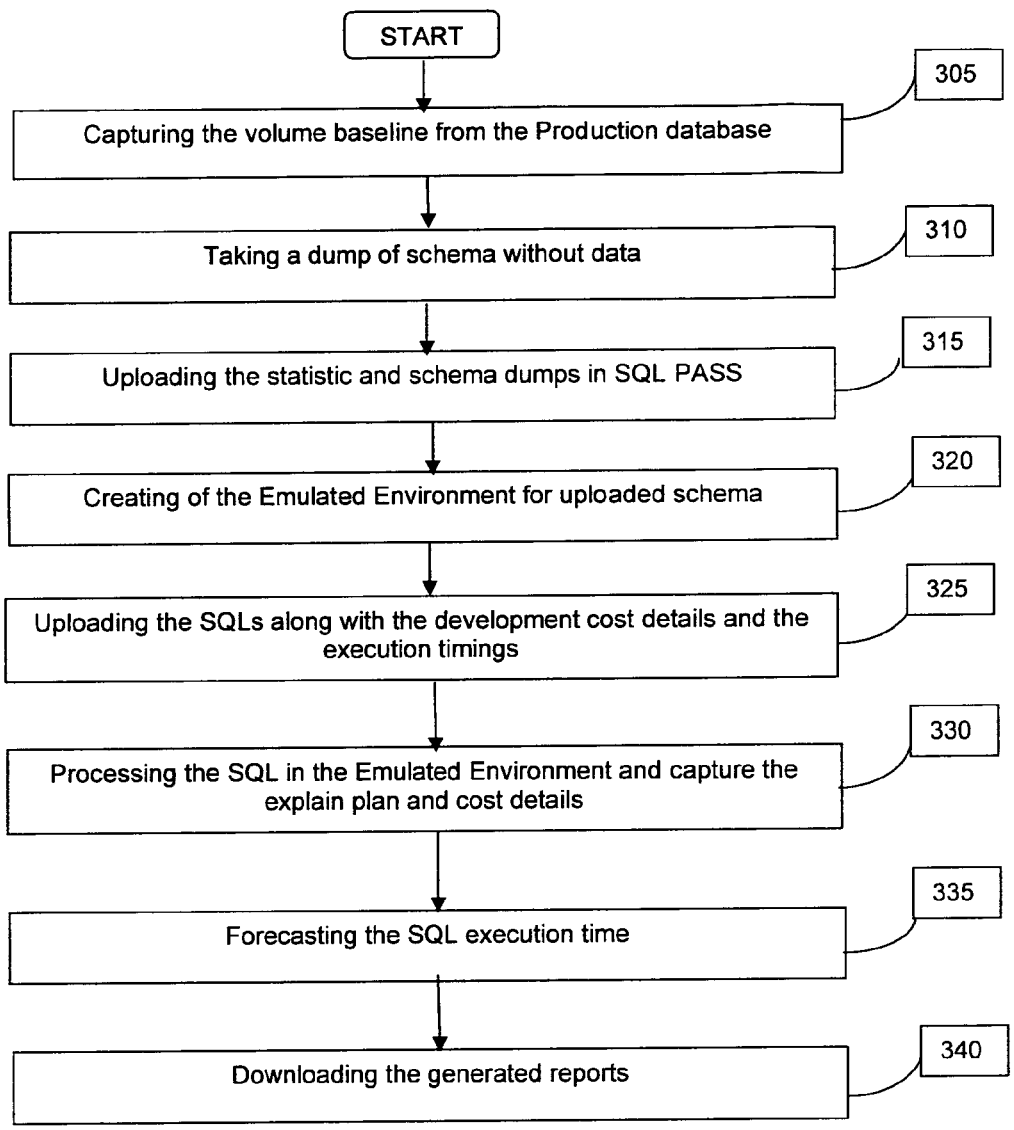
FIG. 3 is a flow chart illustrating the workflow of the invention according to one embodiment of the invention.

FIG. 3 shows a flow chart, illustrating the workflow of the invention according to one embodiment of the invention. In an embodiment of the Invention the present invention provides a secured method of generation of reports after forecasting the SQL execution plan in the emulated environment.

Accordingly, in first step (305), the system captures the volume baseline from the Production Database. (In case of new application, volume baseline can be taken from the development environment) wherein the baseline contains/production database parameters are as follows:
System statistics: CPU speed, Multi block read count, single block read count etc.
Table Statistics: Number of rows, blocks, average row length etc.
Column Statistics: Number of rows, distinct values & nulls, data distribution etc.
Index Statistics: distinct values & nulls, density, hi-low values, average length etc.

After capturing a volume base line, the system takes a dump of schema without data (310) and Upload the statistics and schema dumps in SQL-PASS tool (315). Then, it creates an emulated environment for uploaded schema (320). This creates the empty schema on cloud and super imposes the supplied statistics on it. Further database statistics extrapolation is done as per the requirement to match the required data volume. In the next step, upload the SQLs along with the development cost details and the execution timings (325) and gets processed the SQL in the Emulated Environment and capture the explain plan and cost details (330). Then it forecasts the SQL execution time (335) and in final step the user can download the generated report on the SQL execution time (340).

The present invention employs following formula to forecast the execution time in the production:

$$\text{Forecasted Time} = \left(\frac{\text{(Emulated Cost} * \text{Dev. time)}}{\text{Development Cost}}\right) * \frac{\text{Multiplication}}{\text{factor}}$$

According to one embodiment of the invention the multiplication factor is derived by doing extensive testing in the emulated environment and comparing the results with the production environment.

This multiplication factor is further fine tuned for the following ratios:
Ratio of CPU Cost to IO Cost
Ratio of Expected data (bytes) fetched the production to development
Ratio of Emulated Cost to Development Cost In yet another embodiment of the invention the cost and execution time are measured for each SQL and mostly it will be different in different environment. In SQL-PASS user is expected to upload this information for each SQL for development environment. In return SQL-pass forecast cost and time for production using emulated environment.

According to one embodiment of the invention Development environment parameters: are parameters including but not limited to Execution timing and cost details In an exemplary embodiment of the invention Production database's statistics include:
System statistics: CPU speed, Multi block read count, single block read count etc.
Table Statistics Number of rows, blocks, average row length etc
Column Statistics Number of rows, distinct values & nulls, data distribution etc
Index Statistics: distinct values & nulls, density, hi-low values, average length etc Wherein the system statistics are based on hardware configuration and Table/Column/Index statistics are based on data size in the table.

BEST MODE/EXAMPLE OF WORKING OF THE INVENTION

The invention is described in the example given below which is provided only to illustrate the invention and therefore should not be construed to limit the scope of the invention.

Figure 4:
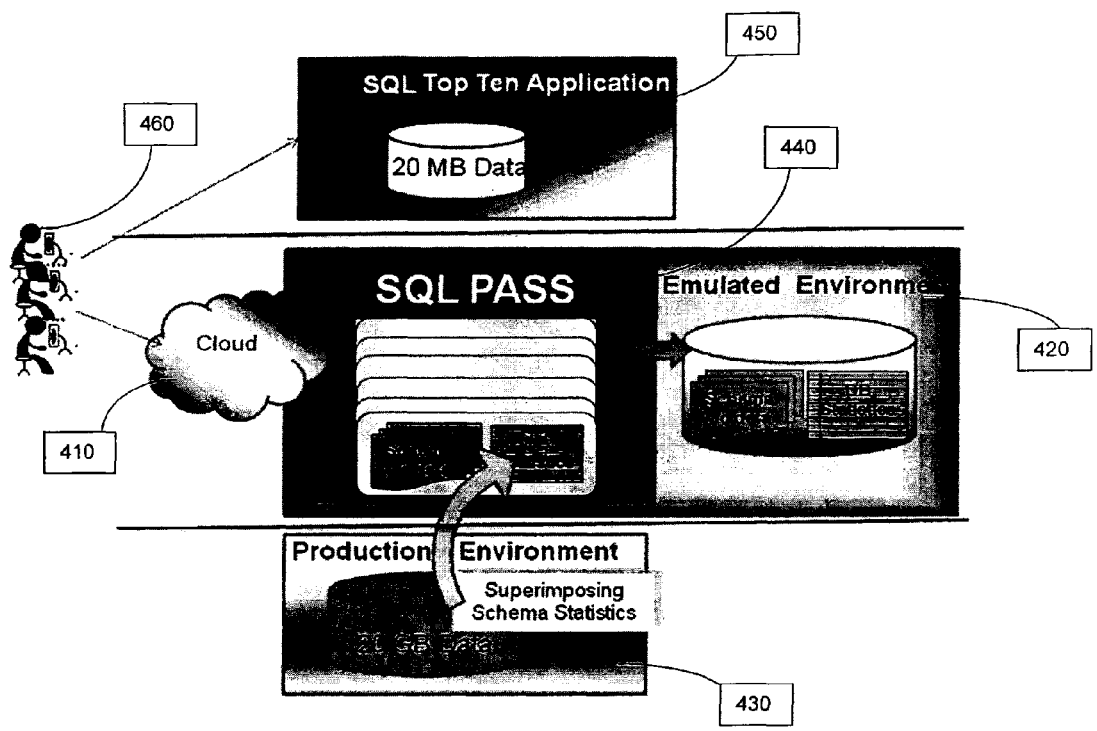
FIG. 4 shows an implementation of the current invention in a cloud based testing service environment, emulated environment and production environment.

FIG. 4 shows a typical implementation of the current invention over a cloud based (410) testing service environment. A virtual emulated environment (420) replicates a production environment (430). The users (460) communicatively connected to the said cloud (410) running the SQL queries on the SQL-PASS (440), wherein the SQL-PASS (440) is integrated with the emulated environment (420) to replicate the production environment's (430) system schema for testing purposes. The performance assurance tool of SQL-PASS (440) provides for various estimations and forecasting related to each of the queries. Each user on the said emulated platform can test the SQL queries to perfect the code.

Advantages of the Invention:
1. Enhancement in software development process specifically by integration of SQL-PASS at various stages of SDLC.
2. Simplified, flexible, and scalable testing practices which provide for waiving off mandatory requirements like tool installation, DBA permissions, and rights.
3. Helps in fine tuning of the SQL performance issues throughout the Software Development Life Cycle.
4. Forecasting the execution time without using any hardware resources from the client's environment.
5. Proactively identifies the performance problems before deployment in the production.
6. Hiring the service just in time and just for the period of need.

The invention claimed is:

1. A system for assuring performance of a plurality of structure query language (SQL) statements, the system comprising:
 a memory comprising instructions;
 a processor coupled to the memory, where the processor is configure to execute the instructions to perform a method comprising:
  capturing a volume baseline from a production database, wherein the volume baseline indicates a plurality of production database statistics;
  retrieving an empty schema of the production database;
  creating an emulated environment based on the production database statistics and the empty schema, wherein the emulated environment is created for testing the performance of each of the plurality of SQL statements to be executed in the production database;
  executing the plurality of SQL statements in the emulated environment to forecast an execution time required by each of the plurality of SQL statements in the production database, wherein the execution time is forecasted using a formula; and
  optimizing an execution plan of at least one of the plurality SQL statements by tuning the at least one of the plurality of SQL statements, wherein the at least one of the plurality of SQL statements is tuned based on the execution time thereby assuring the performance of each of the plurality of SQL statements.

2. The system of claim 1, wherein the execution time is forecasted based on test results of the emulated environment.

3. The system of claim 1, wherein the assuring the performance identifies performance problems before deployment in the production database.

4. The system of claim 1, wherein the emulated environment is a virtual testing platform created by means of a cloud computing.

5. The system of claim 1, wherein the at least one of the plurality of SQL statements is tuned by making necessary changes in the at least one of the plurality of SQL statements.

6. The system of claim 1, wherein the plurality of production database statistics comprises CPU speed, multi block read count, single block read count number of rows, average row length, and distinct values.

7. The system of claim 1, wherein the formula comprises $$\text{forecasted time} = \left( \frac{\text{emulatud cost} * \text{development time}}{\text{development cost}} \right) * \text{multiplication factor.}$$

8. A method for assuring performance of a plurality of structure query language (SQL) statements, the method comprising:
 capturing, by a processor, a volume baseline from a production database, wherein the volume baseline indicates a plurality of production database statistics;
 retrieving, by the processor, an empty schema of the production database;
 creating, by the processor, an emulated environment based on the production database statistics and the empty schema, wherein the emulated environment is created for testing the performance of each of the plurality of SQL statements to be executed in the production database;
 executing, by the processor, the plurality of SQL statements in the emulated environment to forecast an execution time required by each of the plurality of SQL statements in the production database, wherein the execution time is forecasted using a formula; and
 optimizing, by the processor, an execution plan of at least one of the plurality of SQL statements by tuning the at least one of the plurality of SQL statements, wherein the at least one of the plurality of SQL statements is tuned based on the execution time thereby assuring the performance of the plurality of SQL statements.

9. The method of claim 8, wherein the emulated environment is a virtual testing platform created by means of a cloud computing.

10. The method of claim 8, wherein the assuring the performance identifies performance problems before deployment in the production database.

11. The method of claim 8, wherein the at least one of the plurality of SQL statements is tuned by making necessary changes in the at least one of the plurality of SQL statements.

12. The method of claim 8, wherein the plurality of production database statistics comprises CPU speed, multi block read count, single block read count number of rows, average row length, and distinct values.

13. The method of claim 8, wherein the formula comprises $$\text{forecasted time} = \left( \frac{\text{emulatud cost} * \text{development time}}{\text{development cost}} \right) * \text{multiplication factor.}$$

* * * * *